(12) United States Patent
Robinson

(10) Patent No.: US 10,441,066 B2
(45) Date of Patent: Oct. 15, 2019

(54) WAIST-ATTACHABLE MOUNTING ASSEMBLY FOR COMMUNICATION DEVICE

(71) Applicant: Barrion Robinson, Pompano Beach, FL (US)

(72) Inventor: Barrion Robinson, Pompano Beach, FL (US)

( * ) Notice: Subject to any disclaimer, the term of this patent is extended or adjusted under 35 U.S.C. 154(b) by 0 days.

(21) Appl. No.: 15/910,835

(22) Filed: Mar. 2, 2018

(65) Prior Publication Data

US 2019/0269233 A1 Sep. 5, 2019

(51) Int. Cl.
*A45F 5/00* (2006.01)
*A45F 5/02* (2006.01)
*F16C 11/06* (2006.01)
*F16M 13/04* (2006.01)

(52) U.S. Cl.
CPC ............... *A45F 5/02* (2013.01); *F16C 11/06* (2013.01); *F16M 13/04* (2013.01); *A45F 2005/025* (2013.01); *A45F 2200/0508* (2013.01); *A45F 2200/0516* (2013.01); *A45F 2200/0525* (2013.01); *F16M 2200/06* (2013.01)

(58) Field of Classification Search
CPC ... F16M 13/04; A45F 5/00; A45F 2200/0516; A45F 2200/0525
See application file for complete search history.

(56) References Cited

U.S. PATENT DOCUMENTS

| | | | |
|---|---|---|---|
| 5,528,846 A * | 6/1996 | Baggett | F16M 13/04 224/913 |
| 6,137,675 A | 10/2000 | Perkins | |
| 6,158,793 A * | 12/2000 | Castro | B60R 11/02 224/548 |
| 6,352,227 B1 * | 3/2002 | Hathaway | F16M 11/14 248/160 |
| 6,473,941 B2 | 11/2002 | Mei et al. | |
| 6,651,854 B1 | 11/2003 | LaCoste | |
| 6,799,354 B1 | 10/2004 | Goradesky | |
| 7,753,330 B2 * | 7/2010 | Brief | B60R 11/0241 248/278.1 |
| 7,861,985 B2 | 1/2011 | Galvin | |
| 8,505,790 B2 * | 8/2013 | Yu | A45F 5/00 224/185 |
| 9,125,475 B2 * | 9/2015 | Garza, Jr. | H04B 1/3877 |
| 9,179,760 B2 * | 11/2015 | Begay | F16M 13/04 |
| 9,320,345 B2 | 4/2016 | Newton | |

(Continued)

*Primary Examiner* — Adam J Waggenspack
(74) *Attorney, Agent, or Firm* — Mark C. Johnson; Johnson | Dalal

(57) ABSTRACT

A waist-attachable mounting assembly for fastening and selective positioning a communication device from the waist. The mounting assembly is mountable to the waist for retention, accessibility, and selective positioning of the communication device. The mounting assembly provides a waist mount plate that attaches to the waist, a device mount plate that slidably receives the communication device, and multiple articulating arms arranged in an accordion relationship between the mount plates. The articulating arms join from their ends at spherical bearings that enable selective rotational motion, pivotal motion, and translational displacement of the communication device. Alternative articulating arms can be added or removed from this arrangement to increase or decrease the range of the communication device.

17 Claims, 4 Drawing Sheets

(56) References Cited

U.S. PATENT DOCUMENTS

| | | |
|---|---|---|
| 9,693,622 B1 | 7/2017 | Hackett et al. |
| 9,750,332 B2 | 9/2017 | Botticello |
| 2007/0164987 A1* | 7/2007 | Graham .................... A45F 5/00 |
| | | 345/156 |
| 2012/0185999 A1 | 7/2012 | Raviv |
| 2014/0125077 A1 | 5/2014 | Harvey |
| 2015/0029352 A1 | 1/2015 | Burciaga |
| 2015/0223590 A1 | 8/2015 | Arias-Tabima |

* cited by examiner

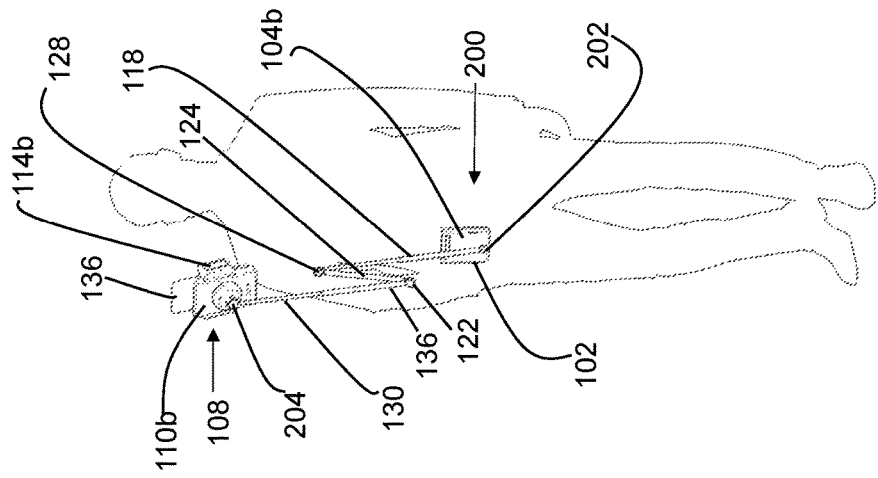
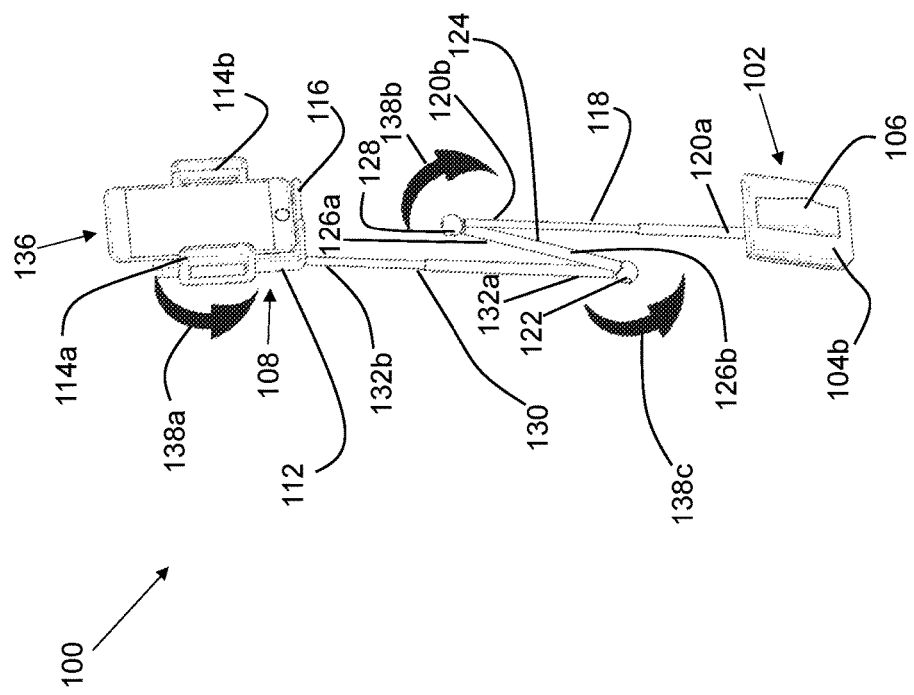

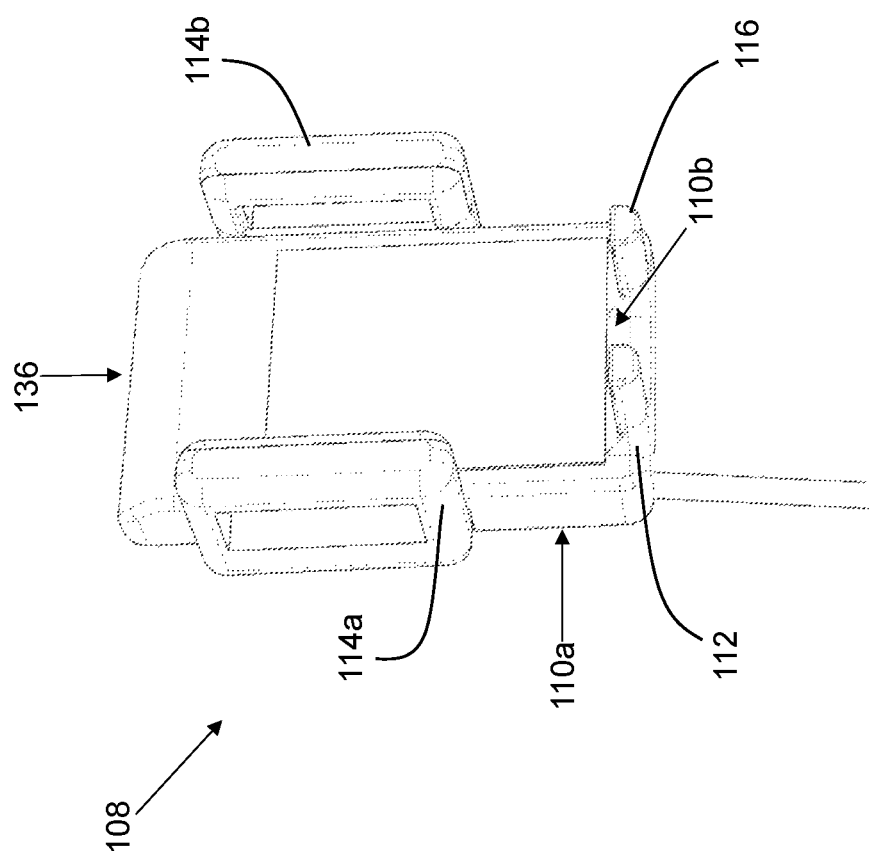

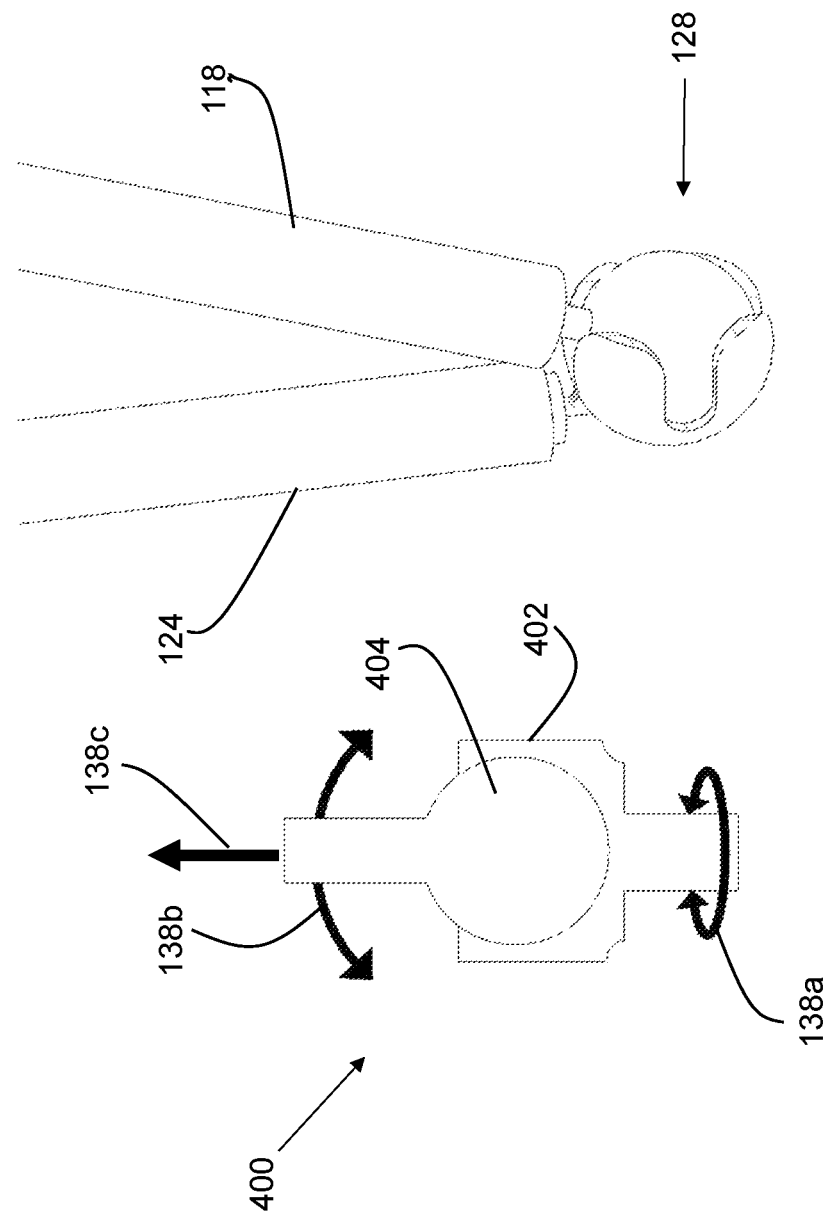

WAIST-ATTACHABLE MOUNTING ASSEMBLY FOR COMMUNICATION DEVICE

FIELD OF THE INVENTION

The present invention relates generally to a waist-attachable mounting assembly for fastening and selectively positioning a communication device from the waist, and more particularly, relates to a mounting assembly mountable to the waist for retention, accessibility, and selective positioning of the communication device; using a mount plate that attaches to the waist, a device mount plate that slidably receives the communication device, multiple articulating arms arranged in an accordion relationship between the mount plates, with the ends of the articulating arms joined at spherical bearings that enable selective rotational motion, pivotal motion, and translational displacement of the communication device.

BACKGROUND OF THE INVENTION

It is known in the art that accessories are useful to carry around. Items like keys, cameras, cellular phones, pagers, tape measures, and hand drills are usually carried so that they can be used in the near future. Users of such accessories desire to carry these items with the least amount of inconvenience while still having their hands free to do other tasks. It is also important that these items are within easy reach when they are needed.

In many instances, these accessories are frequently too large to fit into the front or rear pockets of a person's pants, so they need another way to be carried. The items can be placed in a jacket, vest, backpack, etc. These solutions are inadequate for two reasons. Firstly, they require that the carrier wears another piece of clothing. Secondly, these solutions make it hard to get at the accessories when they are needed.

Typically, communication devices, such as cellular telephones are compact, having a length of approximately 3-4", a width of approximately 1.5-2.5", and a depth of between 0.5-2.5". Users of such communication devices often carry the cellular telephone on a belt about their waist, fastened to a belt or pant waistline. Unfortunately, when attempting to access the cellular phone, the entire fastening or clipping mechanism has to be removed from the belt so that the keys can be accesses. Also, the cellular phone is completely disengaged from the belt, and susceptible to loss or damage.

Therefore, a need exists to overcome the problems with the prior art as discussed above.

SUMMARY OF THE INVENTION

The invention provides a waist-attachable mounting assembly for fastening and selective positioning a communication device from the waist that overcomes the hereinafore-mentioned disadvantages of the heretofore-known devices and methods of this general type and that With the foregoing and other objects in view, there is provided, in accordance with the invention, a waist-attachable mounting assembly for fastening and selective positioning a communication device from the waist. The mounting assembly enables facilitated retention, accessibility, and selective positioning of the communication device. The mounting assembly provides a waist mount plate that attaches to the waist, a device mount plate that slidably receives the communication device, and multiple articulating arms arranged in an accordion relationship between the mount plates. The ends of the articulating arms are joined at spherical bearings that enable selective rotational motion, pivotal motion, and translational displacement of the communication device. Alternative articulating arms can be added or removed to this arrangement to increase or decrease the range of the communication device relative to the waist.

In some embodiments, the waist-attachable mounting assembly is configured to fasten and selectively positioning a communication device directly from the waist. For this purpose, the assembly comprises a waist mount plate defined by an inner side and an outer side. The waist mount plate attaches to the waist or belt from the inner side through a fastening member, such as a clip.

The assembly further comprises a device mount plate defined by a proximal side, a distal side, and a peripheral region. A pair of rails extend towards the distal side, from the peripheral region of the device mount plate. The rails enable the communication device to be slidably received across the distal side. A device support member extends towards the distal side, from the peripheral region of the device mount plate to support the communication device across the distal side.

The assembly further comprises a first articulating arm defined by a first proximal end and a first distal end. The first proximal end is joined with the outer side of the waist mount plate at a first spherical bearing, such as a ball joint. The first spherical bearing enables rotational motion, pivotal motion, and translational displacement of the first articulating arm.

The assembly further comprises a second articulating arm defined by a second proximal end and a second distal end. The second proximal end joins with the first distal end of the first articulating arm at a second spherical bearing. The second spherical bearing enables rotational motion, pivotal motion, and translational displacement of the first articulating arm and the second articulating arm.

The assembly further comprises a third articulating arm defined by a third proximal end and a third distal end. The third proximal end joined with the second distal end of the second articulating arm at a third spherical bearing. The third distal end joined with the proximal side of the device mount plate at a fourth spherical bearing. The third spherical bearing enables rotational motion, pivotal motion, and translational displacement of the second articulating arm and the third articulating arm. The fourth spherical bearing enables rotational motion, pivotal motion, and translational displacement of the third articulating arm.

The assembly further comprises at least one alternative articulating arm defined by a pair of alternative ends. The alternative ends join with the first distal end, or the second proximal end, or the second distal end, or the third proximal end of their respective articulating arms at an alternative spherical bearing, or the second spherical bearing, or the third spherical bearing. The alternative spherical bearing, the second spherical bearing, or the third spherical bearing enable rotational motion, pivotal motion, and translational displacement of the alternative articulating arm.

In yet another embodiment, the articulating arms are arranged in an accordion configuration. Thus, the arms extend and retract from the waist for facilitated access to the communication device.

In accordance with another feature, an embodiment of the present invention further includes at least one alternative articulating arm; whereby the alternative articulating arm is defined by a pair of alternative ends.

In accordance with a further feature of the present invention, the alternative ends of the alternative articulating arm join with the first distal end, or the second proximal end, or the second distal end, or the third proximal end of the respective articulating arms at an alternative spherical bearing, or the second spherical bearing, or the third spherical bearing.

In accordance with a further feature of the present invention, the alternative spherical bearing, the second spherical bearing, or the third spherical bearing enable rotational motion, pivotal motion, and translational displacement of the alternative articulating arm.

In accordance with another feature, an embodiment of the present invention, the pair of rails enable the device mount plate to slidably receive a communication device across the distal side.

In accordance with yet another feature, an embodiment of the present invention, the communication device includes at least one of the following: a cellular phone, a radio, a tablet, a laptop, and an electrical device.

In accordance with a further feature of the present invention, the spherical bearings comprise a ball joint.

In accordance with a further feature of the present invention, the ball joint comprises a casing and a ball.

In accordance with a further feature of the present invention, the fastening member comprises a clip.

In accordance with a further feature of the present invention, the articulated arms may be modified by adding or removing alternative, first, second, or third articulating arms, so as to change the length or the range of the assembly.

Although the invention is illustrated and described herein as embodied in a waist-attachable mounting assembly for a communication device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the mount plates.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 1 is a perspective view of an exemplary waist-attachable mounting assembly for a communication device, showing rotational motion, pivotal motion, and translational displacement of articulating arms, in accordance with an embodiment of the present disclosure;

FIG. 2 is a perspective view of the waist-attachable mounting assembly for a communication device, shown in FIG. 1, mounted to the waist, in accordance with an embodiment of the present disclosure;

FIG. 3 is a close up view of a device mount plate carrying an exemplary communication device, in accordance with an embodiment of the present disclosure;

FIG. 4 is a sectioned side view of an exemplary ball joint, showing the casing encapsulating the ball, and the attached articulating arm exhibiting rotational motion, pivotal motion, and translational displacement, in accordance with an embodiment of the present disclosure;

FIG. 5 is a perspective view of an exemplary spherical bearing, in accordance with an embodiment of the present disclosure.

DETAILED DESCRIPTION

Figure 6:
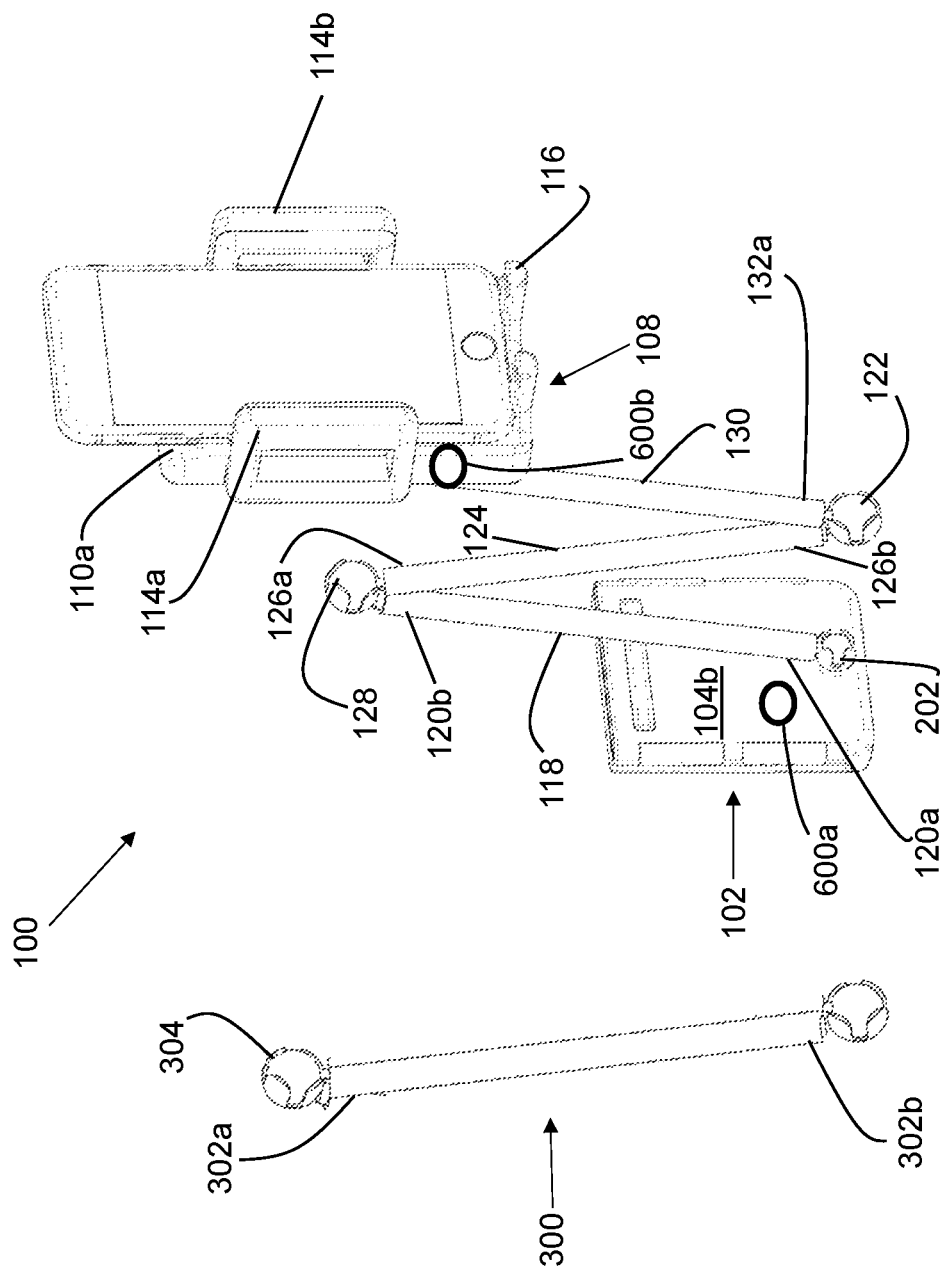
FIG. 6 is a front perspective view of a waist-attachable mounting assembly for a communication device, and an alternative articulating arm, in accordance with an embodiment of the present disclosure.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient waist-attachable mounting assembly 100 for fastening and selective positioning a communication device 136 from the waist 200. Embodiments of the invention provide a waist mount plate 102 that detachably fastens to the waist 200, and a device mount plate 108 that slidably receives and retains a communication device 136.

In addition, embodiments of the invention provide articulating arms 118, 124, 130, 300 configured into an accordion arrangement between the mount plates 102, 108 to enable extension and retraction of the communication device 136 from the waist 200. In addition, embodiments of the invention provide spherical bearings 202, 128, 122, 204, 304 forming a nexus between the articulating arms 118, 124, 130, 300 to enable rotational motion, pivotal motion, and translational displacement of the communication device 136. In addition, alternative articulating arms 300 can be added or removed to this arrangement to increase or decrease the range of the communication device 136 relative to the waist 200.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components.

The first example of a waist-attachable mounting assembly 100 for a communication device 136, as shown in FIG. 1, includes a waist mount plate 102 that detachably attaches at or near the waist 200. The waist 200 includes: a midregion near the waist, navel, or lower back, a pant waistline, and a belt loop forming in a pair of pants. Those skilled in the art will recognize that the waist 200 is a convenient place on the body to retain a communication device 136 because audible and tactile signals are proximal, and the hands are in proximity to the waist 200. The waist 200, especially for males, also includes belt loops and pant waistlines that form mounting structures top mount the communication device.

As FIG. 2 illustrates, the waist mount plate 102 attaches to the waist 200. The waist mount plate 102 is defined by an inner side 104a that engages the waist 200, and an outer side 104b that is oriented away from the waist 200. The waist mount plate 102 attaches to the waist 200 from the inner side 104a through a fastening member 106. The fastening member 106 enables fast, easy detachability from the waist 200. The fastening member 106 may include, without limitation, a clip, a button, a rod, a hook and loop fastener, an adhesive, a magnet, and a cable.

In another possible embodiment, the fastening member 106 is a spring-loaded clip that detachably attaches the waist mount plate 102 to the waist 200. In any case, the fastening member 106 enables secure attachment to the waist 200, while also allowing for quick removal thereof through an application of force. Suitable materials for the waist mount plate 102 may include, without limitation, aluminum, metal alloys, rigid polymer, fiberglass, rubber, and wood.

In addition to the waist mount plate 102, the assembly 100 further comprises a device mount plate 108 (FIG. 3). The device mount plate 108 is configured to enable detachable mounting of a communication device 136. The communication device 136 may include, without limitation, a cellular phone, a tablet, a laptop, a radio, and an electrical device. Though the communication device 136 may also include any device that enables communication, is hand held, and attachable to the device mount plate 108.

The device mount plate 108 is defined by a proximal side 110a that is oriented towards the waist 200, a distal side 110b oriented away from the waist 200, and a peripheral region 112. The peripheral region 112 may include an edge that forms the periphery of the device mount plate 108. In one non-limiting embodiment, shown in FIG. 2, the device mount plate 108 comprises a generally rectangular shape, which matches the shape of a cellular phone, or smart phone known in the art.

Thus, because of the structural compatibilities between the communication device 136 and the device mount plate 108, the communication device 136 may be operated while mounted to the device mount plate 108. This facilitates operation of the assembly 100, as the communication device 136 does not have to be removed from the device mount plate 108 to operate. Suitable materials for the device mount plate 108 may include, without limitation, aluminum, metal alloys, rigid polymer, fiberglass, rubber, and wood.

In one non-limiting embodiment, the communication device 136 overlays the distal side 110b of the device mount plate 108. The device mount plate 108 is configured to securely retain the communication device 136 on the device mount plate 108. In one non-limiting embodiment, the device mount plate 108 is sized and dimensioned to receive a cellular phone having a length of between approximately 3-4", a width of approximately 1.5-2.5", and a thickness or depth of between 0.5-2.5".

In another embodiment, a pair of rails 114a, 114b extend towards the distal side 110b, from the peripheral region 112 of the device mount plate 108. The rails 114a, 114b enable the communication device 136 to be slidably received across the distal side 110b. In one embodiment, shown in FIG. 6, the rails 114a, 114b extend from the long edges of the device mount plate 108. The rails 114a, 114b may include a groove that slidably engages corresponding edges from the communication device 136 in a snug, friction fit relationship.

To provide additional retention for the communication device 136, the assembly 100 further provides a device support member 116 that extends towards the distal side 110b, from the peripheral region 112 of the device mount plate 108. The device support member 116 supports the communication device 136 across the distal side 110b. In one embodiment, shown in FIG. 2, the device support member 116 extends from a bottom, short edge of the device mount plate 108. In some embodiments, the device support member 116 comprises a pair of elongated flanges arranged in a spaced-apart relationship. In this manner, the communication device 136 is supported from the side edges by the rails 114a, 114b and the bottom edge by the device support member 116.

In order to allow for myriad orientations, lengths, and positions of the communication device, the assembly 100 comprises multiple articulating arms 118, 124, 130, 304 configured in an accordion arrangement between the mount plates 102, 108. The articulating arms 118, 124, 130, 304 join from their ends at spherical bearings 202, 128, 122, 304 that enable the articulating arms 118, 124, 130, 304 to easily extend, retract, rotate, pivot, and geometrically displace in translational articulations. In this manner, the device mount plate 108—and thereby the communication device 136— may be manipulated in myriad combinations of movement.

For example, a user grasps and manipulates the communication device 136 by speaking into the communication device 136, viewing a display screen on the communication device 136, inputting data into the communication device 136, and sharing the communication device 136 with a second user.

This unique freedom of movement of the articulating arms 118, 124, 130, 304 allows the communication device 136 to be grasped and manipulated more easily while attached to the waist 200, or while the communication device 136 is operational away from the waist 200. In this configuration, the articulating arms 118, 124, 130, 304 provides for various degrees of freedom and selective length adjustments of the communication device 136 during use. Suitable materials for the articulating arms may include, without limitation, aluminum, steel, titanium, metal alloys, and a rigid polymer.

In one non-limiting embodiment shown in FIG. 6, three articulating arms (first articulating arm 118, second articulating arm 124, third articulating arm 130) may be configured in series from the waist mount plate 102 to the device mount plate 108 and following an accordion arrangement. In other embodiments, the articulated arms 118, 124, 130, 304 may be modified by adding at least one alternative articulating arm 300, or removing the first, second, and third articulating arms, so as to change the length or the range of the assembly 100 and enable selective positioning of the communication device 136 at a desired angle and orientation. This length and positional adjustability creates great flexibility to accommodate different waists and communication devices 136.

Looking back at FIG. 1, a first articulating arm 118 extends from the outer side 104b of the waist mount plate 102, serving as the first link from the waist 200. The first articulating arm 118 is defined by a first proximal end 120a joined to the waist mount plate 102, and an opposite first distal end 120b. In one possible embodiment, the first proximal end 120a of the first articulating arm 118 joins with the outer side 104b of the waist mount plate 102 at a first spherical bearing 202, such as a ball joint 400 or other rotatable bearing known in the art (FIG. 5).

As the close up view of FIG. 4 shows, the first spherical bearing 202 comprises a ball joint 400. The ball joint 400 is configured to enable rotational motion 138a, pivotal motion 138b, and translational displacement 138c of the first articulating arm 118. This articulation is possible because the spherical bearing 202, 128, 122, 304 comprises a ball joint 400. The ball joint 400 comprises a casing 402 that encapsulates a ball 404, forming a snug relationship therebetween. The ball 404 freely rotates inside the casing 402, which allows for rotational motion, pivotal motion, and translational displacement of the articulating arms 118, 124, 130, 300.

In some embodiments, a lubricant may be added inside the casing 402 to facilitate movement of the ball 404. In other embodiments, the ball 404 may form ridges that create incremental movement inside the casing 402. The relationship between the ball 404 and casing 402 is sufficiently snug to support the weight of the device mount plate 108 and communication device 136 while the articulating arms are fully extended. However, applying a force to the articulating arms 118, 124, 130, 300, such as to retract or raise the articulating arms overcomes the frictional forces between the ball 404 and casing 402.

Continuing the linkage of articulating arms from the first articulating arm 118, the assembly 100 further comprises a second articulating arm 124. The second articulating arm 124 is substantially the same as the first articulating arm 118, with the position being the only significant difference. The second articulating arm 124 is defined by a second proximal end 126a that joins with the first distal end 120b of the first articulating arm 118 at a second spherical bearing 128, which is substantially the same as the first spherical bearing 202 described above. The second spherical bearing 128 enables rotational motion, pivotal motion, and translational displacement of the first articulating arm 118 and the second articulating arm 124. The second articulating arm 124 is further defined a second distal end 126b, opposite the second proximal end 126a.

Continuing with the linkage of articulating arms, the assembly 100 further comprises a third articulating arm 130 that attaches to the device mount plate 108. The third articulating arm 130 is defined by a third proximal end 132a and a third distal end 132b. The third proximal end 132a joins with the second distal end 126b of the second articulating arm 124 at a third spherical bearing 122, which is substantially the same as the first spherical bearing 202 described above.

Further, the third distal end 132b of the third articulating arm 130 joins with the proximal side 110a of the device mount plate 108 at a fourth spherical bearing 204, which is substantially the same as the first spherical bearing 202 described above. The third spherical bearing 122 enables rotational motion, pivotal motion, and translational displacement of the second articulating arm 124 and the third articulating arm 130. The fourth spherical bearing 204 enables rotational motion 138a, pivotal motion 138b, and translational displacement 138c of the third articulating arm 130 about the device mount plate 108.

As discussed above, additional articulating arms may be added to increase the range of the assembly 100. For this configuration, the assembly 100 provides at least one alternative articulating arm 300 (FIG. 6). In one embodiment, the alternative articulating arm 300 may be attached between the first and second articulating arms 118, 124, or the second and third articulating arm 124, 130. This attachment between alternative articulating arm 300 and the first, second, or third articulating arms 118, 124, 130 may be formed through snap-fit relationships, threaded rotational attachments, welded bonds, magnetic connections, or adhesive means known in the art. Thus, the articulating arms 118, 124, 130 create a greater range and translational motion to extend, retract, rotate, pivot, and translate the communication device 136 in relation to the waist 200 for operation thereof.

Looking again at FIG. 6, the alternative articulating arm 300 is defined by a pair of alternative ends 302a, 302b. The alternative ends 302a, 302b join with the first distal end 120b, or the second proximal end 126a, or the second distal end 126b, or the third proximal end 132a of their respective articulating arms 118, 124, 130 at an alternative spherical bearing 304, or the second spherical bearing 128, or the third spherical bearing 122. As taught with the other spherical bearings, the alternative spherical bearing 304, the second spherical bearing 128, or the third spherical bearing 122 enable rotational motion 138a, pivotal motion 138b, and translational displacement 138c of the alternative articulating arm 300.

In one alternative embodiment, the assembly 100 is configured to enable wireless communication between the communication device 136 and components, such as the waist mount plate 102 and the device mount plate 108. This may include at least one button 600a-b, or switch, that actuates specific events on the communication device 136. In some embodiments, the button 600a-b may be engaged to exchange data over a short distances using short-wavelength UHF radio waves in the ISM band from 2.4 to 2.485 GHz. Though in other embodiments, other forms of wireless communication allow the button 600a-b to operate the communication device 136. For example, the button 600a-b captures an image or video from the communication device 136. FIG. 6 illustrates a first button 600a operational on the waist mount plate 102, and a second button operational on the device mount plate 108. Either button may be engaged to capture the image, or perform other functions known in the art of communication devices, cellular phones, radios, and the like. It is also significant to note that since the articulating arms enable high degrees of rotation and pivoting, the captured image may be from the front or the rear camera of the communication device.

In operation, a user may utilize the assembly 100 to attach a communication device 136, such as a cellular phone to the waist 200 (FIG. 2). The waist mount plate 102 is clipped onto a belt or pant waistline through a fastening member 106. The communication device 136 slides into the device mount plate 108 between the rails 114a, 114b, with the device support member 116 snugly retaining the communication device 136 across the distal side 110b of the device mount plate 108. The user may retract the device mount plate 108 flush against the waist mount plate 102 when carrying, but not operating the communication device 136.

To operate the communication device 136, the user grasps the device mount plate 108 and extends to a desired length and orientation. While operating the communication device 136, the user has the option of rotational motion 138a, pivotal motion 138b, and translational displacement 138c because of the relationship between articulating arms and spherical bearings. This unique freedom of movement allows the user to speak into the communication device 136, view a display screen on the communication device 136, input data into the communication device 136, and share the communication device 136 with a second user. The user may also add at least one alternative articulating arm 300 between the first and second 118, 124, or second and third articulating arms 124, 130 to increase the range of translational movement by the communication device 136.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A waist-attachable mounting assembly for fastening and selectively positioning a communication device from the waist, the assembly comprising:
   a waist mount plate having an inner side with a spring-loaded clip fastener coupled thereto and an outer side, opposing the inner side of the waist mount plate, the waist mount plate with a button disposed thereon;
   a device mount plate defined by a proximal side, a distal side, and a peripheral region with a device support member extending therefrom and disposed on the distal side of the device mount plate, the device mount plate having a button disposed thereon;
   a pair of rails extending towards the distal side, from the peripheral region of the device mount plate, wherein the device mount plate, the device support member, and the pair of rails are operably configured to detachable mount a communication device thereon, the buttons on the waist mount plate and the device mount plate operably configured to selectively depress to enable wireless communication, using ultra high frequency (UHF) radio waves, with the communication device;
   a first articulating arm defined by a first proximal end and a first distal end, the first proximal end joined with the outer side of the waist mount plate at a first spherical bearing, the first spherical bearing enabling rotational motion, pivotal motion, and translational displacement of the first articulating arm;
   a second articulating arm defined by a second proximal end and a second distal end, the second proximal end joined with the first distal end of the first articulating arm at a second spherical bearing, the second spherical bearing enabling rotational motion, pivotal motion, and translational displacement of the first articulating arm and the second articulating arm; and
   a third articulating arm defined by a third proximal end and a third distal end, the third proximal end joined with the second distal end of the second articulating arm at a third spherical bearing, the third spherical bearing enabling rotational motion, pivotal motion, and translational displacement of the second articulating arm and the third articulating arm, the third distal end joined with the proximal side of the device mount plate at a fourth spherical bearing, the fourth spherical bearing enabling rotational motion, pivotal motion, and translational displacement of the third articulating arm,
   whereby the articulating arms are configured in an accordion arrangement.

2. The assembly according to claim 1, further comprising:
at least one alternative articulating arm, the alternative articulating arm defined by a pair of alternative ends.

3. The assembly according to claim 2, wherein:
the alternative ends of the alternative articulating arm join with the first distal end, or the second proximal end, or the second distal end, or the third proximal end at an alternative spherical bearing, or the second spherical bearing, or the third spherical bearing.

4. The assembly according to claim 3, wherein:
the alternative spherical bearing, the second spherical bearing, or the third spherical bearing enable rotational motion, pivotal motion, and translational displacement of the alternative articulating arm.

5. The assembly according to claim 1, wherein:
the pair of rails enable the device mount plate to slidably receive a communication device across the distal side.

6. The assembly according to claim 5, wherein:
the communication device includes at least one of the following: a cellular phone, a radio, a tablet, a laptop, and an electrical device.

7. The assembly according to claim 1, wherein:
the device support member is an elongated pair of flanges with an upper surface operably configured to support the communication device.

8. The assembly according to claim 1, wherein:
the spherical bearings comprise a ball joint.

9. The assembly according to claim 8, wherein:
the ball joint comprises a casing and a ball.

10. A waist-attachable mounting assembly for fastening and selectively positioning a communication device from the waist, the assembly comprising:
   a waist mount plate having an inner side with a spring-loaded clip fastener coupled thereto and an outer side, opposing the inner side of the waist mount plate, the waist mount plate with a button disposed thereon and the inner side of the waist mount plate comprising a clip;
   a device mount plate defined by a proximal side, a distal side, and a peripheral region with a device support member extending therefrom and disposed on the distal side of the device mount plate, the device mount plate having a button disposed thereon;
   a pair of rails extending towards the distal side, from the peripheral region of the device mount plate, wherein the device mount plate, the device support member, and the pair of rails are operably configured to detachable mount a communication device thereon, the buttons on the waist mount plate and the device mount plate operably configured to selectively depress to enable wireless communication, using ultra high frequency (UHF) radio waves, with the communication device;

a first articulating arm defined by a first proximal end and a first distal end, the first proximal end joined with the outer side of the waist mount plate at a first spherical bearing, the first spherical bearing enabling rotational motion, pivotal motion, and translational displacement of the first articulating arm;

a second articulating arm defined by a second proximal end and a second distal end, the second proximal end joined with the first distal end of the first articulating arm at a second spherical bearing, the second spherical bearing enabling rotational motion, pivotal motion, and translational displacement of the first articulating arm and the second articulating arm;

a third articulating arm defined by a third proximal end and a third distal end, the third proximal end joined with the second distal end of the second articulating arm at a third spherical bearing, the third spherical bearing enabling rotational motion, pivotal motion, and translational displacement of the second articulating arm and the third articulating arm, the third distal end joined with the proximal side of the device mount plate at a fourth spherical bearing, the fourth spherical bearing enabling rotational motion, pivotal motion, and translational displacement of the third articulating arm; and at least one alternative articulating arm defined by a pair of alternative ends, the alternative ends joined with the first distal end, or the second proximal end, or the second distal end, or the third proximal end at an alternative spherical bearing, or the second spherical bearing, or the third spherical bearing, the alternative spherical bearing, the second spherical bearing, or the third spherical bearing enabling rotational motion, pivotal motion, and translational displacement of the alternative articulating arm, whereby the articulating arms are configured in an accordion arrangement.

11. The assembly according to claim 10, wherein:
the pair of rails enable the device mount plate to slidably receive a communication device across the distal side.

12. The assembly according to claim 10, further comprising:
a device support member extending towards the distal side, from the peripheral region of the device mount plate, the device support member is an elongated pair of flanges with an upper surface operably configured to support the communication device.

13. The assembly according to claim 10, wherein:
the spherical bearings are of a ball joint.

14. The assembly according to claim 13, wherein:
the ball joint comprises a casing and a ball.

15. A waist-attachable mounting assembly for fastening and selectively positioning a communication device from the waist, the assembly consisting of:

a waist mount plate having an inner side with a spring-loaded clip fastener coupled thereto and an outer side, opposing the inner side of the waist mount plate, the waist mount plate with a button disposed thereon;

a device mount plate defined by a proximal side, a distal side, and a peripheral region with a device support member extending therefrom and disposed on the distal side of the device mount plate, the device mount plate having a button disposed thereon;

a pair of rails extending towards the distal side, from the peripheral region of the device mount plate, wherein the device mount plate, the device support member, and the pair of rails are operably configured to detachable mount a communication device thereon, the buttons on the waist mount plate and the device mount plate operably configured to selectively depress to enable wireless communication, using ultra high frequency (UHF) radio waves, with the communication device;

a first articulating arm defined by a first proximal end and a first distal end, the first proximal end joined with the outer side of the waist mount plate at a first ball joint, the first ball joint enabling rotational motion, pivotal motion, and translational displacement of the first articulating arm;

a second articulating arm defined by a second proximal end and a second distal end, the second proximal end joined with the first distal end of the first articulating arm at a second ball joint, the second ball joint enabling rotational motion, pivotal motion, and translational displacement of the first articulating arm and the second articulating arm;

a third articulating arm defined by a third proximal end and a third distal end, the third proximal end joined with the second distal end of the second articulating arm at a third spherical bearing, the third spherical bearing enabling rotational motion, pivotal motion, and translational displacement of the second articulating arm and the third articulating arm, the third distal end joined with the proximal side of the device mount plate at a fourth spherical bearing, the fourth spherical bearing enabling rotational motion, pivotal motion, and translational displacement of the third articulating arm;

at least one alternative articulating arm defined by a pair of alternative ends, the alternative ends joined with the first distal end, or the second proximal end, or the second distal end, or the third proximal end at an alternative ball joint, or the second spherical bearing, or the third spherical bearing, the alternative ball joint, the second spherical bearing, or the third spherical bearing enabling rotational motion, pivotal motion, and translational displacement of the alternative articulating arm, whereby the articulating arms are configured in an accordion arrangement; and a device support member extending from the peripheral region of the device mount plate.

16. The assembly according to claim 15, wherein:
the pair of rails enable the device mount plate to slidably receive a communication device across the distal side.

17. The assembly according to claim 16, wherein:
the ball joint comprises a casing and a ball.

* * * * *